US012190760B2

(12) United States Patent
Sun et al.

(10) Patent No.: US 12,190,760 B2
(45) Date of Patent: Jan. 7, 2025

(54) DISPLAY SYSTEM AND POWER-SAVING METHOD THEREOF

(71) Applicant: Coretronic Projection (Kunshan) Corporation, Jiangsu (CN)

(72) Inventors: Yifei Sun, Jiangsu (CN); Ying Zhang, Jiangsu (CN); Qing Lu, Jiangsu (CN); Yebing Zhang, Jiangsu (CN)

(73) Assignee: Coretronic Projection (Kunshan) Corporation, Jiangsu (CN)

( * ) Notice: Subject to any disclaimer, the term of this patent is extended or adjusted under 35 U.S.C. 154(b) by 0 days.

(21) Appl. No.: 18/433,411

(22) Filed: Feb. 6, 2024

(65) Prior Publication Data

US 2024/0274044 A1 Aug. 15, 2024

(30) Foreign Application Priority Data

Feb. 14, 2023 (CN) ......................... 202310110912.3

(51) Int. Cl.
*G09G 3/00* (2006.01)
*G09G 5/00* (2006.01)

(52) U.S. Cl.
CPC ............. *G09G 3/002* (2013.01); *G09G 5/006* (2013.01); *G09G 2330/022* (2013.01); *G09G 2370/02* (2013.01); *G09G 2370/22* (2013.01)

(58) Field of Classification Search
None
See application file for complete search history.

(56) References Cited

U.S. PATENT DOCUMENTS

2007/0220150 A1* 9/2007 Garg ..................... H04L 12/282 710/38
2010/0128179 A1* 5/2010 Jeon ....................... G09G 5/006 348/739
2011/0069240 A1* 3/2011 Su ........................ H04N 9/3179 348/744
2014/0092312 A1* 4/2014 Furihata ............... H04N 21/436 348/706
2015/0015380 A1* 1/2015 Choi ................ H04N 21/42222 340/12.22

(Continued)

FOREIGN PATENT DOCUMENTS

CN 100505032 6/2009
CN 100505032 C * 6/2009

(Continued)

*Primary Examiner* — Dorothy Harris
(74) *Attorney, Agent, or Firm* — JCIPRNET

(57) ABSTRACT

A display system and a power-saving method thereof are provided. In a first standby mode, a control circuit of a display device detects whether a preset pin of a signal input port generates a voltage variation or maintains at a preset voltage value during a preset period. When the control circuit detects the voltage variation or the preset voltage value, the control circuit switches the display device to a second standby mode and generates an output signal according to an input signal received by the signal input port, and allows the output signal to be transmitted to the signal output port, or establishes a network connection according to the input signal. When the control circuit does not detect the voltage variation nor the preset voltage, the first standby mode is maintained by the control circuit.

19 Claims, 8 Drawing Sheets

(56) References Cited

U.S. PATENT DOCUMENTS

| | | | | |
|---|---|---|---|---|
| 2016/0103476 | A1* | 4/2016 | Kim | G06F 3/1423<br>345/1.3 |
| 2017/0064388 | A1* | 3/2017 | Yu | G06F 1/1643 |
| 2018/0088768 | A1* | 3/2018 | Nakagawa | G03B 21/2053 |
| 2020/0133366 | A1* | 4/2020 | Whitby-Strevens | G06F 1/266 |
| 2021/0407458 | A1* | 12/2021 | Shimuzu | G06F 13/4077 |

FOREIGN PATENT DOCUMENTS

| | | |
|---|---|---|
| CN | 112083794 | 12/2020 |
| CN | 114765002 | 7/2022 |

* cited by examiner

DISPLAY SYSTEM AND POWER-SAVING METHOD THEREOF

CROSS-REFERENCE TO RELATED APPLICATION

This application claims the priority benefit of China application serial no. 202310110912.3 filed on Feb. 14, 2023. The entirety of the above-mentioned patent application is hereby incorporated by reference herein and made a part of this specification.

BACKGROUND

Technical Field

The disclosure relates to an electronic device, and in particular relates to a display system and a power-saving method therefore.

Description of Related Art

Generally speaking, projectors all have a standby mode, which may save unnecessary power consumption. With the advancement of technology, projectors may have multiple standby modes with different power consumption. When users set the standby mode function, they often need to call out a drop-down menu through a remote controller or buttons to adjust the standby mode setting. When the projector has a variety of signal transmission ports, it is necessary to set the relevant energy-saving and power-saving standby mode settings for each signal transmission port, so as to avoid continuous power supply to the signal transmission ports when the projector is in the standby mode, resulting in unnecessary power consumption. Such a way of setting each signal transmission port through the drop-down menu often requires the user to go back and forth through multi-layer menus, and the cumbersome setting steps cause waste of time and energy, and reduce the convenience of using the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

An embodiment of the disclosure provides a display system, including a first display device. The first display device includes an illumination module, a signal input port, a signal output port, and a control circuit. The first display device is adapted to switch between a normal operation mode, a first standby mode (low power consumption standby mode) and a second standby mode (high power consumption standby mode). The illumination module provides an illumination beam in the normal operation mode, and does not provide the illumination beam in the first standby mode and the second standby mode. The signal input port has a preset pin. In the first standby mode, the signal input port and the signal output port are disabled, and in the second standby mode, the signal input port and the signal output port are enabled. The control circuit is coupled to the illumination module, the signal input port, and the signal output port. In the first standby mode, the control circuit detects whether the preset pin of the signal input port generates a voltage variation or maintains at a preset voltage value during a preset period. When the control circuit detects the voltage variation or the preset voltage value, the control circuit switches the first display device to a second standby mode and generates an output signal according to an input signal received by the signal input port, and allows the output signal to be transmitted to the signal output port, or establishes a network connection of the first display device according to the input signal received by the signal input port. When the control circuit does not detect the voltage variation or the preset voltage value, the first standby mode is maintained by the control circuit, in which both the voltage variation and the preset voltage value are greater than 0.

The disclosure further provides a power-saving method for a display system. The display system includes a first display device. The first display device includes an illumination module, a signal input port, a signal output port, and a control circuit. The first display device is adapted to switch between a normal operation mode, a first standby mode, and a second standby mode. The illumination module provides an illumination beam in the normal operation mode, and does not provide the illumination beam in the first standby mode and the second standby mode. The power-saving method of the display system includes the following operation. Determining whether the first display device is in the first standby mode by the control circuit of the first display device. Detecting whether a preset pin of the signal input port generates a voltage variation or maintains at a preset voltage value by the control circuit during a preset period when the first display device is in the first standby mode. The first display device is switched to the second standby mode through the control circuit when the voltage variation or the preset voltage value is detected. An output signal is generated by the control circuit according to an input signal received by the signal input port, and the output signal is allowed to be transmitted to the signal output port, or a network connection of the first display device is established by the control circuit according to the input signal received by the signal input port. The first display device is maintained in the first standby mode when neither the voltage variation nor the preset voltage value is detected, in which both the voltage variation and the preset voltage value are greater than 0.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

A display system and a power-saving method thereof, which may effectively avoid the waste of time and power caused by setting the standby mode of projection and greatly improve the convenience of using a projector, are provided.

The other objectives and advantages of the disclosure may be further understood from the descriptive features disclosed in the disclosure.

Figure 1:
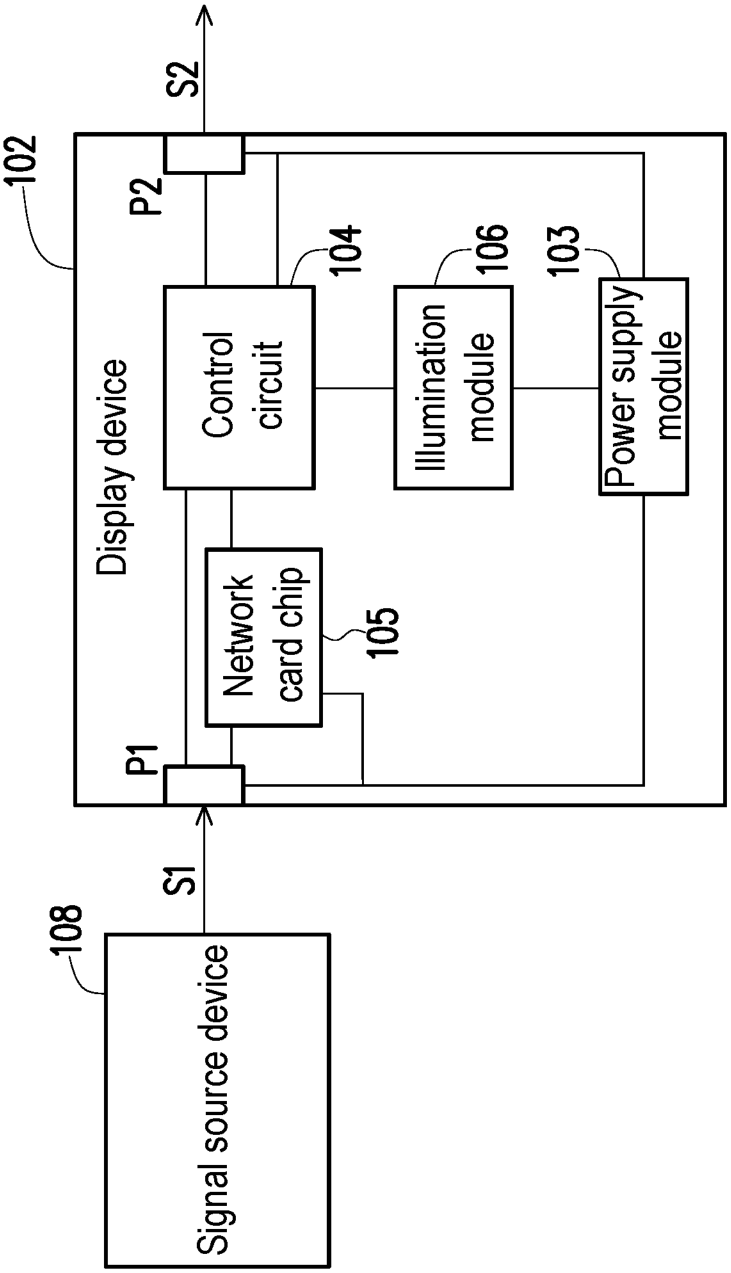
FIG. 1 is a schematic diagram of a display system according to an embodiment of the disclosure.

FIG. 1 is a schematic diagram of a display system according to an embodiment of the disclosure, please refer to FIG. 1. The display system may include a display device 102. The display device 102 includes an illumination module 106, a signal input port P1, a signal output port P2, a power supply module 103, and a control circuit 104. The control circuit 104 may be, for example, a microprocessor, which is coupled to the signal input port P1, the signal output port P2, the power supply module 103, and the illumination module 106. The display device 102 is adapted to switch between a normal operation mode, a first standby mode, and a second standby mode. For example, the power supply module 103 provides power to at least one of the signal input port P1, the signal output port P2, the control circuit 104, and the illumination module 106 according to different modes. The display device 102 may be, for example, a projector. In a normal operation mode, the power supply module 103 can, for example, supply power to the illumination module 106, the signal input port P1, the signal output port P2, and the control circuit 104. The illumination module 106 may provide an illumination beam, which may be converted into an image beam through a light valve and projected onto a projection surface to display a projected image. The first standby mode is, for example, a mode in which the standby power consumption is lower than 0.5 watts, and the second standby mode is, for example, a mode in which the standby power consumption is higher than 0.5 watts and lower than the power consumption of the normal operation mode. In the first standby mode and the second standby mode, for example, in order to keep the display device 102 in a standby state, the power supply module 103, for example, does not supply power to the illumination module 106.

In the first standby mode and the second standby mode, in order to keep the display device 102 in a power-saving state, the power supply module 103 does not supply power to the illumination module 106, and the illumination module 106 does not provide an illumination beam. The first standby mode may be, for example, a low power consumption standby mode, and the second standby mode may be, for example, a high power consumption standby mode. In the first standby mode (low power consumption standby mode), the display device 102 does not support the signal transmission function of the signal input port P1 and the signal output port P2 (the signal input port P1 and the signal output port P2 are disabled), that is, the power supply module 103, for example, does not supply power to the signal output port P2; in the second standby mode (high power consumption standby mode), the display device 102 supports the signal transmission function of the signal output port P2 (the signal input port P1 and the signal output port P2 are enabled), that is, the power supply module 103, for example, supplies power to the signal output port P2.

The signal input port P1 of the display device 102 may include preset pins. For example, when the signal input port P1 is an RJ45 port, either the Data+ pin or the Data− pin of the signal input port P1 (RJ45 port) may be used as a preset pin. For another example, when the signal input port P1 and the signal output port P2 are VGA ports, the V-Sync pin of the signal input port P1 (VGA port) may be used as a preset pin. In addition, the signal input port P1 is not limited to the RJ45 port and the VGA port. In other embodiments, the signal input port P1 and the signal output port P2 may also be, for example, HDMI ports, audio ports, TRS ports, and S/PDIF ports. The data transmission pins or power pins of these signal input ports may also be used as preset pins.

When the display device 102 is in the first standby mode, the control circuit 104 may detect whether the preset pin of the signal input port P1 generates a voltage variation or maintains at a preset voltage value during a preset period. When the control circuit 104 detects that the preset pin of the signal input port P1 generates a voltage variation or maintains at a preset voltage value, the control circuit 104 may switch the display device 102 from the first standby mode to the second standby mode and generate an output signal S2 according to the input signal S1 received by the signal input port P1 from the signal source device 108, and allow the output signal S2 to be transmitted to the signal output port P2 for output. The voltage variation and the preset voltage value may be, for example, both greater than 0. Conversely, when the control circuit 104 does not detect that the preset pin of the signal input port P1 generates a voltage variation nor a preset voltage, the control circuit 104 maintains the display device 102 in the first standby mode, and continuously detects whether the preset pin generates a voltage variation or maintains at the preset voltage value. When the display device 102 switches from the first standby mode to the second standby mode, the control circuit 104 may directly take the input signal S1 received from the signal source device 108 as the output signal S2 and transmit it to the signal output port P2. Alternatively, the control circuit 104 firstly performs a signal conversion process on the input signal S1, and then generates the output signal S2 to the signal output port P2. The input signal S1 may be, for example, a network signal, an image signal, or an audio signal according to different types of the signal input port P1. When the input signal S1 is a network signal, the input signal S1 may also include a remote control signal, that is, the remote control signal may, for example, come from the signal source device 108. The control circuit 104 may switch the display device 102 to the normal operation mode, the first standby mode, or the second standby mode according to the received remote control signal.

In addition, when the display device is in the second standby mode, the control circuit 104 may periodically detect whether the preset pin still generates a voltage variation or maintains at a preset voltage. If the voltage variation nor the preset voltage of the preset pin of the signal input port P1 is not detected during another preset period, the control circuit 104 may switch the display device 102 from the second standby mode to the first standby mode.

In some embodiments, the control circuit 104 may also provide a status signal (not labeled) to the signal source device 108 that provides the input signal S1 through the signal input port P1. The status signal is configured to indicate the operation mode of the display device 102, for example, to inform the signal source device 108 that the current status of the display device 102 is in the normal operation mode, the first standby mode, or the second standby mode.

Figure 2:
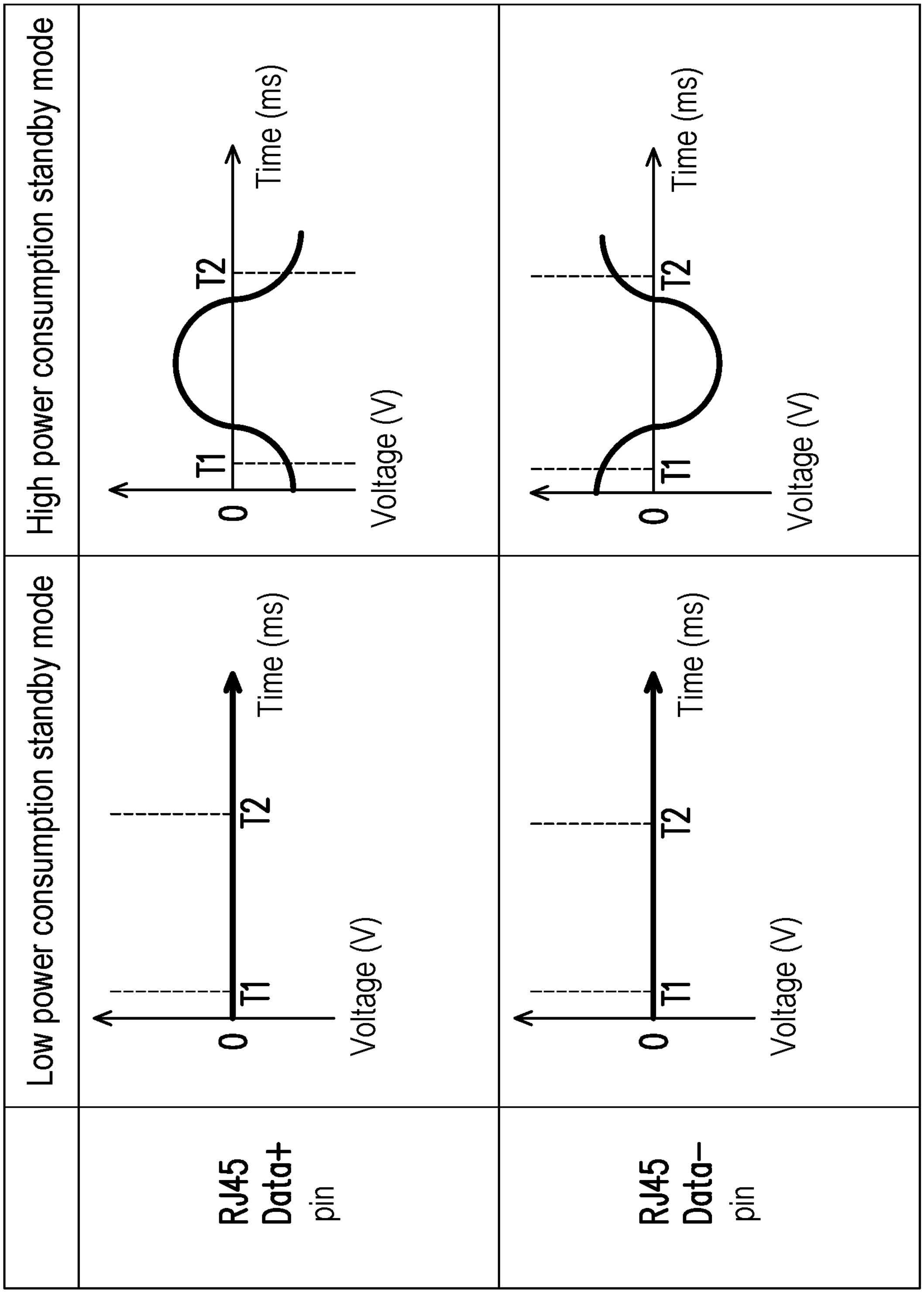
FIG. 2 is a waveform diagram of signals of preset pins of an RJ45 port according to an embodiment of the disclosure.
Figure 3:
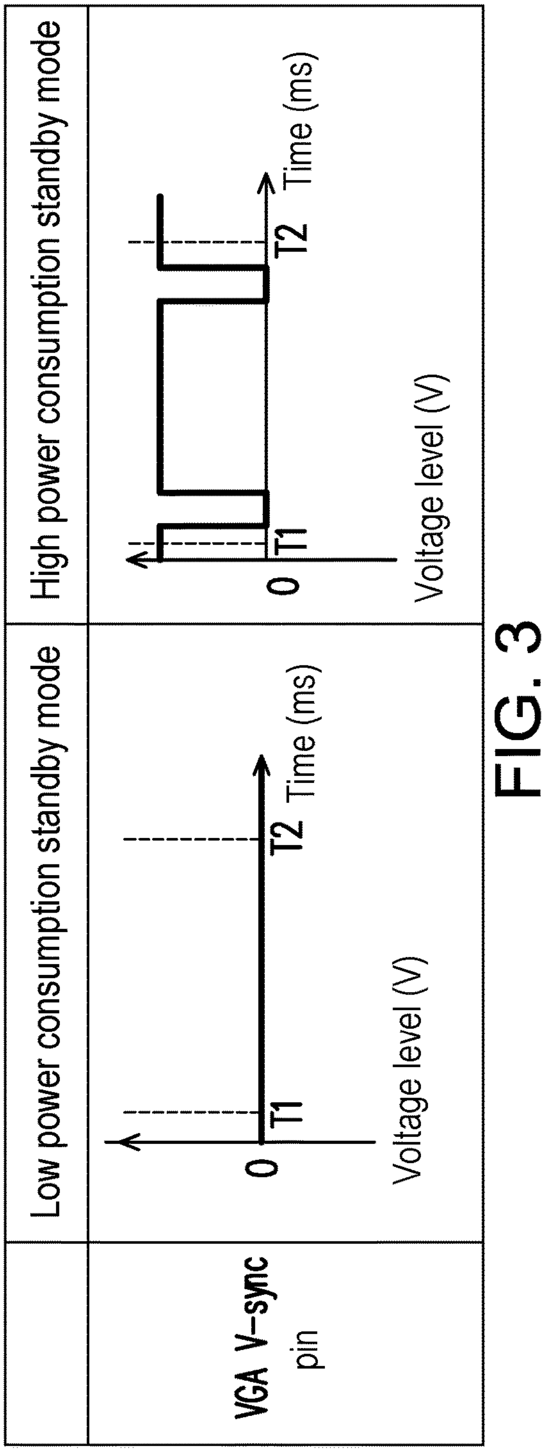
FIG. 3 is a waveform diagram of a signal of a preset pin of a VGA port according to an embodiment of the disclosure.
Figure 4:
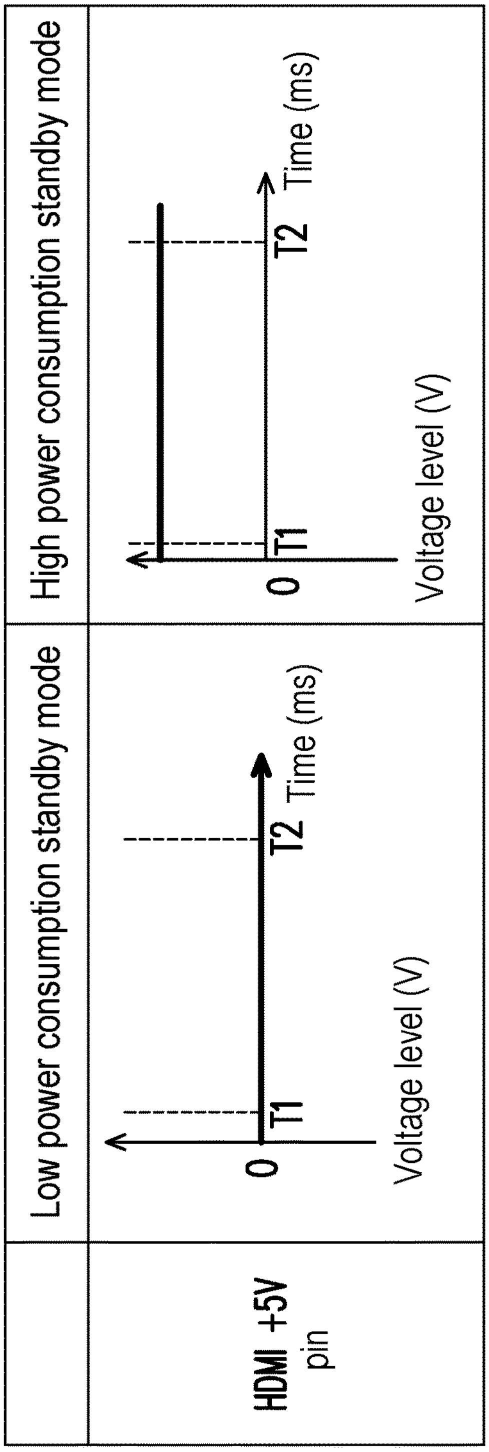
FIG. 4 is a waveform diagram of a signal of a preset pin of an HDMI port according to an embodiment of the disclosure.

Furthermore, the input signal S1 received by the preset pin of the signal input port P1 may be as shown in FIG. 2 to FIG. 4. In the embodiment of FIG. 2, referring to FIG. 1 and FIG. 2 at the same time, the signal input port P1 is an RJ45 port, and the preset pin is the Data+ pin or Data− pin of the RJ45 port. When the signal input port P1 is not connected to the network transmission line, or is connected to the network transmission line but the other end of the network transmission line is not connected to the signal source device 108, the control circuit 104 detects that the Data+ pin or the Data− pin is maintained at a constant zero voltage. When the signal source device 108 is connected to the signal input port P1 through the network transmission line, the Data+ pin or the Data− pin transmits data, so the Data+ pin or the Data− pin generates a voltage variation.

In detail, in this embodiment, the display device 102 further includes a network card chip 105 coupled between the control circuit 104 and the signal input port P1. When the display device 102 is in the first standby mode (low power consumption standby mode), the network transmission function is turned off, that is, the control circuit 104 controls the power supply module 103 not supplying power to the network card chip 105 to perform the network transmission function (e.g., such that the input signal S1 is transmitted to the control circuit 104 through the signal input port P1). When the signal source device 108 is connected to the signal input port P1 of the display device 102 through the network transmission line, the control circuit 104 detects a voltage variation on the Data+ pin or the Data− pin of the signal input port P1. Therefore, the control circuit 104 determines that the signal source device 108 communicates with the display device 102 through the network. The control circuit 104 switches the display device 102 into the second standby mode (high power consumption standby mode), and the power supply module 103 provides a power supply voltage to the network card chip 105, so that the network card chip 105 may execute the network transmission function. That is, when the display device 102 switches to the second standby mode, the control circuit 104 turns on the network card chip 105 to establish a network connection between the display device 102 and the signal source device 108, thereby realizing the function of the signal source device 108 operating the display device 102 through the signal input port P1. When the network transmission line is removed from the signal input port P1, the control circuit 104 detects that there is no signal input to the signal input port P1, causing the Data+ pin or Data− pin of the signal input port P1 to be detected as maintaining at a constant zero voltage for a preset period (e.g., 5 seconds). Therefore, the control circuit 104 determines that the network connection between the display device 102 and the signal source device 108 has been disconnected. The control circuit 104 controls the power supply module 103 to stop supplying power to the network card chip 105 and automatically turn off the network transmission function, and the display device 102 enters the first standby mode (low power consumption standby mode) to save energy.

When the control circuit 104 determines whether the voltage of the Data+ pin or the Data− pin changes during a preset period (e.g., the preset period defined by the time point T1 to the time point T2 shown in FIG. 2), detection may be performed multiple times during the preset period. For example, the control circuit 104 may detect whether the voltage of the Data+ pin or the Data− pin changes every 10 ms. In FIG. 2, if the control circuit 104 detects continuously during the preset period defined by the time point T1 to the time point T2, and the Data+ pin or Data− pin maintains at constant zero voltage during the preset period (e.g., the left figure of FIG. 2), it may be confirmed that the network transmission line is removed. If the control circuit 104 detects continuously during the preset period defined by the time point T1 to the time point T2, and there is a voltage variation at the Data+ pin or Data− pin during the preset period (e.g., the right figure of FIG. 2), it is determined that the network transmission line is connected to the signal input port P1.

In the embodiment of FIG. 3, referring to FIG. 1 and FIG. 3 at the same time, the signal input port P1 is a VGA port, and the preset pin of the VGA port is a V-Sync pin. Similarly, when there is no signal input to the signal input port P1 of the display device 102, the control circuit 104 detects that the V-Sync pin of the signal input port P1 maintains at a constant low voltage level (e.g., the voltage value is lower than 0.2V voltage level, in some embodiments the voltage value of the low voltage level may also be close to or equal to zero). When the signal input port P1 of the display device 102 receives a VGA signal, the control circuit 104 detects that the voltage level of the V-Sync pin of the signal input port P1 changes periodically (e.g., when the input signal S1 is a 60 Hz signal, V-Sync has a low voltage level signal about every 16.7 ms).

The difference between this embodiment and the RJ45 port of the above embodiment is that the VGA input port is usually a passive receiving unit and cannot be turned on or off by the control circuit 104, but the control circuit 104 may control the transmission function of the signal output port P2. When the display device 102 is in the first standby mode (low power consumption standby mode), the transmission function of the signal output port P2 is preset to be off (e.g., no power is supplied to the signal output port P2). When the signal source device 108 is connected to the signal input port P1 through the VGA transmission line, the control circuit 104 detects that there is a signal input to the V-Sync pin of the signal input port P1 during the preset period defined by the time point T1 to the time point T2, resulting in periodic variation of the voltage level. Based on this, the control circuit 104 determines that the signal source device 108 communicates with the display device 102 through the VGA transmission line, and enters the second standby mode (high power consumption standby mode) from the first standby mode (low power consumption standby mode). At this time, the control circuit 104 controls the power supply module 103 to provide the power supply voltage to the output circuit of the signal output port P2, and automatically turns on the output function of the signal output port P2, so that the output signal S2 generated according to the input signal S1 of the signal source device 108 may be output through the signal output port P2. When the VGA transmission line is removed from the signal input port P1, the control circuit 104 detects that the V-Sync pin of the signal input port P1 maintains at a constant low voltage level during a preset period, indicating that the VGA transmission line connecting the display device 102 to the signal source device 108 has been disconnected. The control circuit 104 controls the power supply module 103 to stop supplying power to the output circuit of the signal output port P2, and automatically turns off the output function of the signal output port P2, so that the display device 102 enters the first standby mode (low power consumption standby mode) to save energy. In FIG. 3, if the control circuit 104 detects continuously during the preset period defined by the time point T1 to the time point T2, and the V-Sync pin maintains at a low voltage level during the preset period (e.g., the left figure of FIG. 3), it may be confirmed that the VGA transmission line is removed. If the control circuit 104 detects continuously during the preset period defined by the time point T1 to the time point T2, and there is a periodic voltage level variation at the V-Sync pin during the preset period (e.g., the right figure of FIG. 3), it is determined that the VGA transmission line is connected to the signal input port P1. The aforementioned voltage level variation period varies according to the frequency of the input signal S1, for example, the signal period of a 60 Hz signal is 16.7 ms, and the signal period of a 120 Hz signal is 8.3 ms. The preset period for the control circuit 104 to determine whether the preset pin has periodic variation may be adjusted according to the frequency of the input signal S1. For example, for the input signal S1 of 60 Hz and 120 Hz, the preset period may be set to be greater than 16.7 ms, so as to ensure that the periodic voltage level variation of the preset pin for at least one period may be detected.

In the embodiment of FIG. 4, referring to FIG. 1 and FIG. 4 at the same time, the signal input port P1 is a HDMI port, and the preset pin of the HDMI port is a +5V pin. Similarly, the control circuit 104 may also determine whether to switch the display device 102 from the first standby mode (low power consumption standby mode) to the second standby mode (high power consumption standby mode) by detecting the voltage level variation of the +5V pin of the signal input port P1 during the preset period defined by the time point T1 to the time point T2. In FIG. 4, if the control circuit 104 detects continuously during the preset period defined by the time point T1 to the time point T2, and there is no voltage variation at the +5V pin during the preset period (e.g., the left figure of FIG. 4), it may be confirmed that the HDMI transmission line is removed. If the control circuit 104 detects continuously during the preset period defined by the time point T1 to the time point T2, and the +5V pin maintains at a low voltage level during the preset period (e.g., the right figure of FIG. 4), it is determined that the HDMI transmission line is connected to the signal input port P1. In this embodiment, the control circuit 104 determines whether the display device 102 switches from the first standby mode (low power consumption standby mode) to the second standby mode (high power consumption standby mode) according to whether the +5V pin of the signal input port P1 is at a constant high voltage level, so as to determine whether to disable or enable the transmission function of the signal input port P1 and the signal output port P2.

Figure 5:
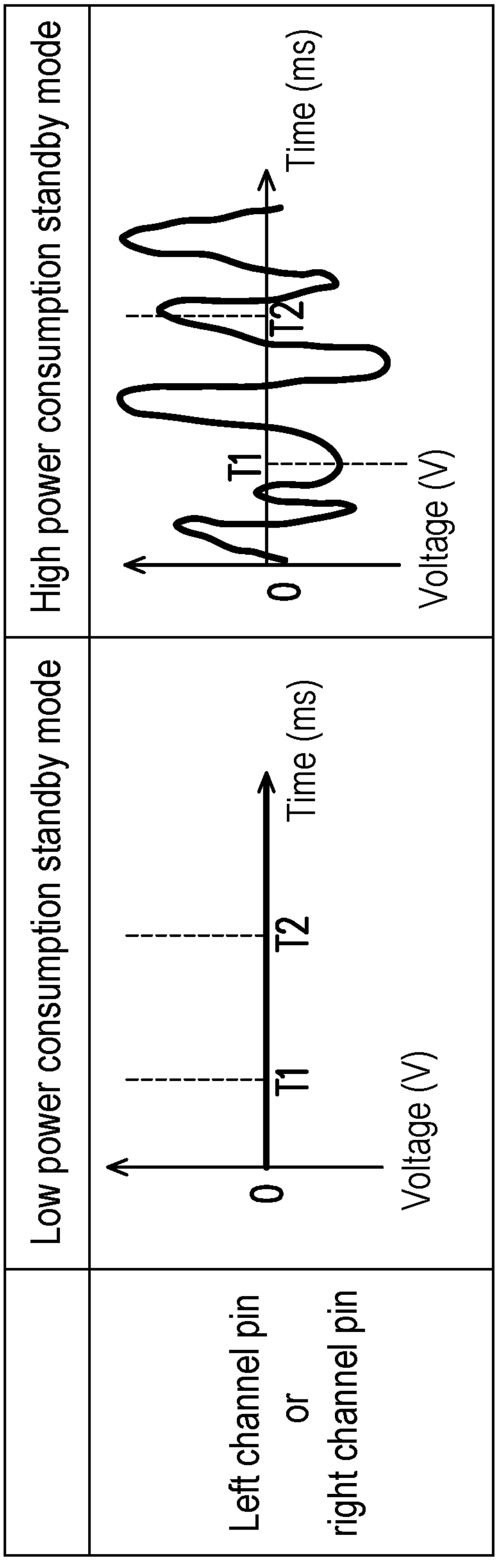
FIG. 5 is a waveform diagram of a pin signal of an audio port according to an embodiment of the disclosure.
Figure 6:
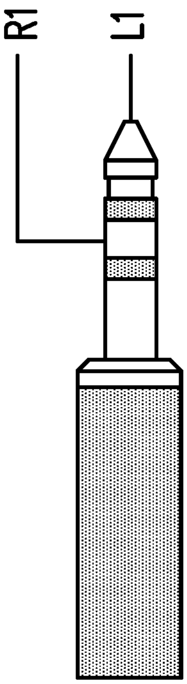
FIG. 6 is a schematic diagram of an audio connector according to an embodiment of the disclosure.

In the embodiment of FIG. 5, referring to FIG. 1 and FIG. 5 at the same time, the signal input port P1 is an audio port, and the preset pin of the signal input port P1 is configured to connect the tip L1 or the middle ring R1 of the audio connector as shown in FIG. 6, to receive the left channel signal or the right channel signal from the tip L1 or the middle ring R1 of the audio connector as the input signal S1. Similarly, in the embodiment, the control circuit 104 may determine whether to switch the display device 102 from the first standby mode (low power consumption standby mode) to the second standby mode (high power consumption standby mode) by detecting the voltage variation of the input signal S1 of the preset pin of the signal input port P1 during the preset period defined by the time point T1 to the time point T2.

Figure 7:
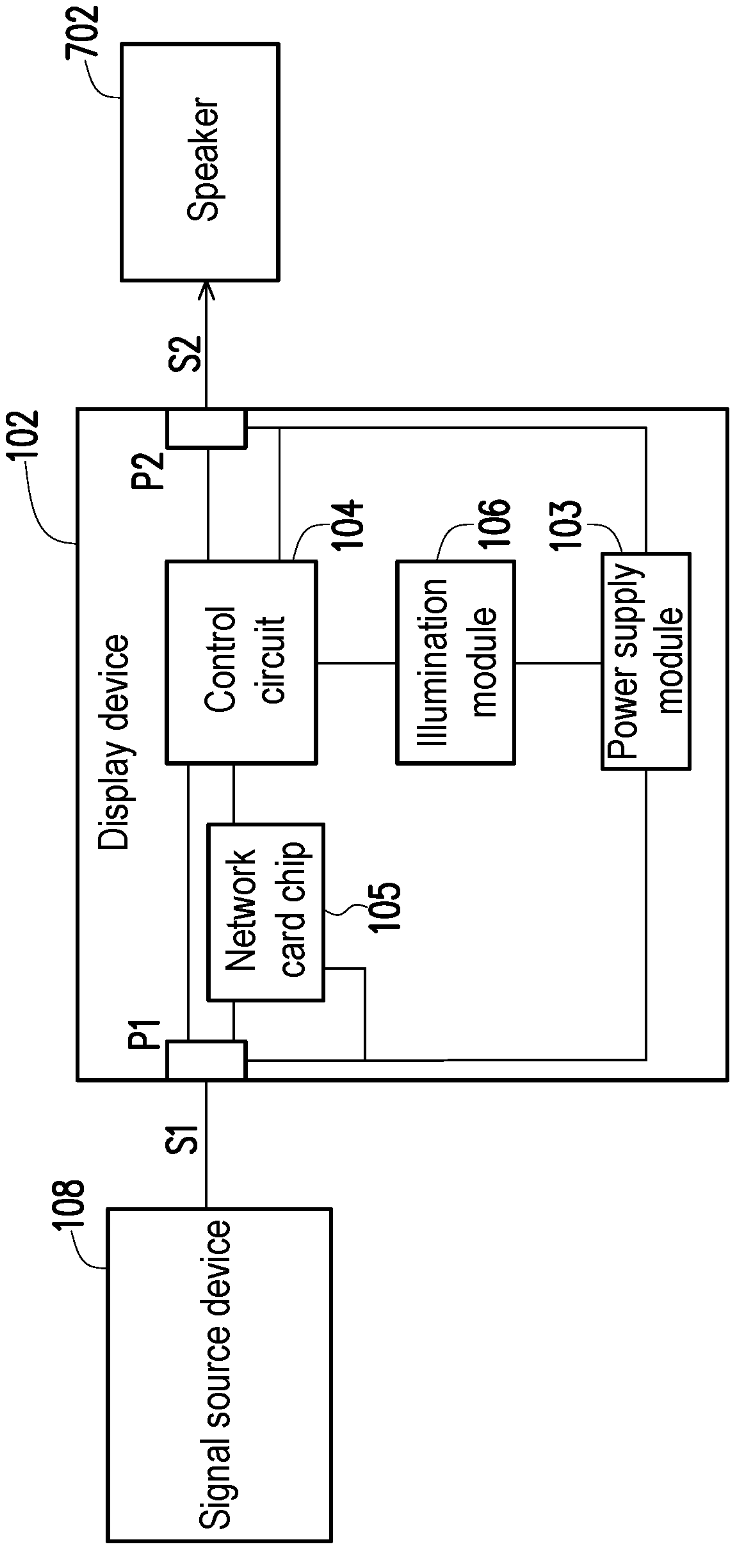
FIG. 7 is a schematic diagram of a display system according to another embodiment of the disclosure.

When the signal input port P1 has no signal input, the preset pin of the signal input port P1 maintains at a constant zero voltage, and when the signal input port P1 receives the input signal S1, the voltage of the preset pin of the signal input port P1 is an irregularly changing voltage signal. The difference between this embodiment and the aforementioned RJ45 port is that the audio input port is usually also a passive receiving unit and cannot be turned on or off by the control circuit 104, but the control circuit 104 may control the transmission function of the signal output port P2. When the signal source device 108 is connected to the signal input port P1 of the projector through the audio connector of the audio transmission line, the control circuit 104 detects that the preset pin of the signal input port P1 is a non-zero voltage during the preset period defined by the time point T1 to the time point T2. Therefore, the control circuit 104 determines that the signal source device 108 communicates with the display device 102 through the audio transmission line. The control circuit 104 automatically turns on the transmission function of the signal output port P2, and controls the power supply module 103 to provide a power supply voltage to the output circuit of the signal output port P2, so that the output signal S2 may be output by the signal output port P2, and the display device 102 enters the second standby mode (high power consumption standby mode). In FIG. 5, if the control circuit 104 detects continuously during the preset period defined by the time point T1 to the time point T2, and the preset pin (left channel pin or right channel pin) maintains at a zero voltage (e.g., the left figure of FIG. 5) during the preset period, it may be confirmed that the audio connector is removed. The control circuit 104 controls the power supply module 103 to stop supplying power to the output circuit of the signal output port P2, and automatically turns off the transmission function of the signal output port P2, so that the projector enters the first standby mode (low power consumption standby mode) to save energy. If the control circuit 104 detects continuously during the preset period defined by the time point T1 to the time point T2, and the preset pin (left channel pin or right channel pin) generates a voltage variation during the preset period (e.g., the right figure of FIG. 5), it is determined that the audio connector is connected to the signal input port P1. The output signal S2 may be, for example, as shown in FIG. 7, output to the speaker 702 connected to the display device 102, so as to play the audio corresponding to the output signal S2.

Figure 8:
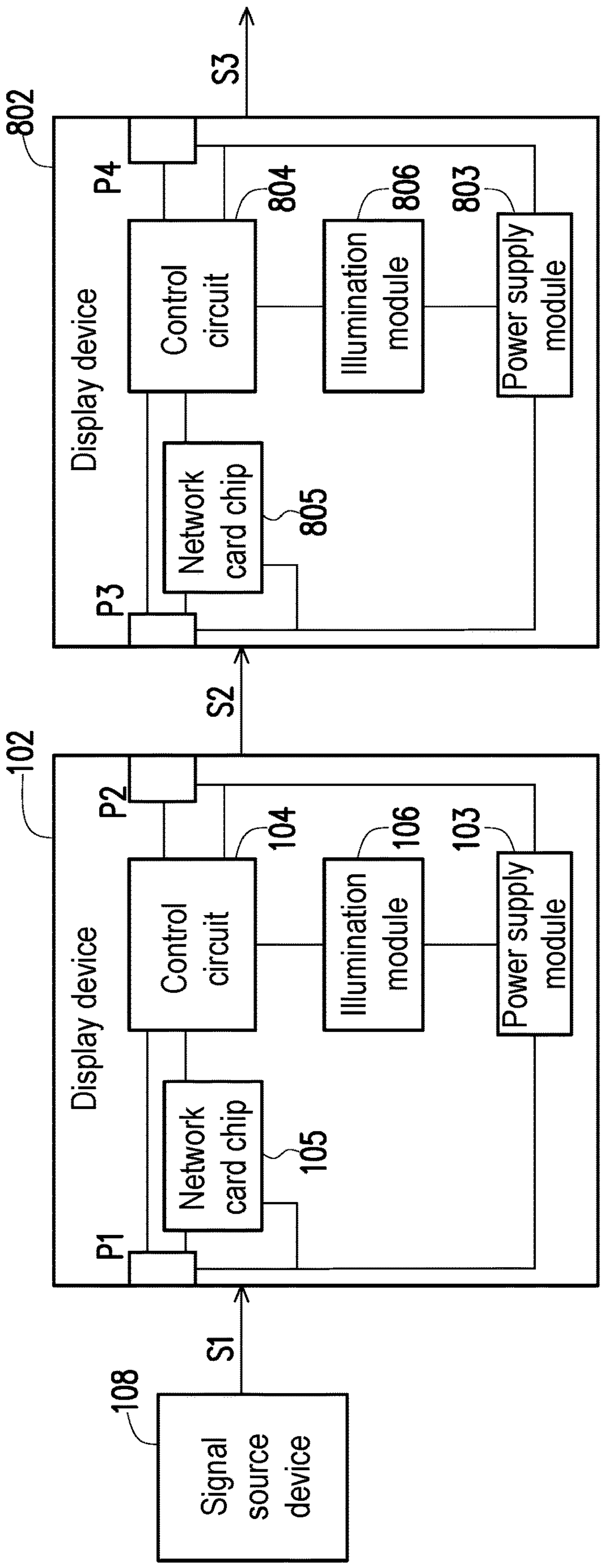
FIG. 8 is a schematic diagram of a display system according to another embodiment of the disclosure.

FIG. 8 is a schematic diagram of a display system according to another embodiment of the disclosure. In this embodiment, the display system may further include a display device 802, which has the same structure as the display device 102. As shown in FIG. 8, the display device 802 includes an illumination module 806, a signal input port P3, a signal output port P4, a power supply module 803, a network card chip 805, and a control circuit 804. The control circuit 804 is coupled to the signal input port P1, the signal output port P2, the power supply module 803, the network card chip 805, and the illumination module 806. The implementation method of the display device 802 is the same as that of the display device 102 in the above-mentioned embodiment, so the implementation details thereof are not repeated herein. As described in the above embodiments, in the second standby mode, the display device may still have the signal transmission function when the illumination module does not provide the illumination beam. Therefore, in the embodiment of FIG. 8, when both the display device 102 and the display device 802 enter the second standby mode due to detecting that the preset pins of the signal input ports P1 and P3 generate a voltage variation or maintain at a preset voltage value, the display device 102 and the display device 802 may serve as a relay device to transmit the input signal S1 from the signal source device 108. The output signal S2 of the display device 102 and the output signal S3 of the display device 802 may be the same as the input signal S1, or may be converted signals according to the input signal S1. It should be noted that the number of display devices connected in series is not limited to the embodiment shown in FIG. 8, and the display system may include more display devices connected in series in other embodiments.

In this way, using the display device as a relay device to transmit input signals may improve the convenience of using the display system. For example, there are multiple display devices in a large venue, and each display device is separated by a certain distance. If it is intended to connect each display device to a playback device on the podium, the construction would not only be difficult, but the wiring would also be too many, and thereby it is inconvenient for users to operate. In this case, the playback device of the podium is only required to be connected to one of the display devices, and the connected display device and other serially connected display devices may enter the second standby mode (high energy consumption standby mode) and assist in transmitting signals to the playback device of the podium. In addition, the user may also freely choose to specify the display device to display images.

Figure 9:
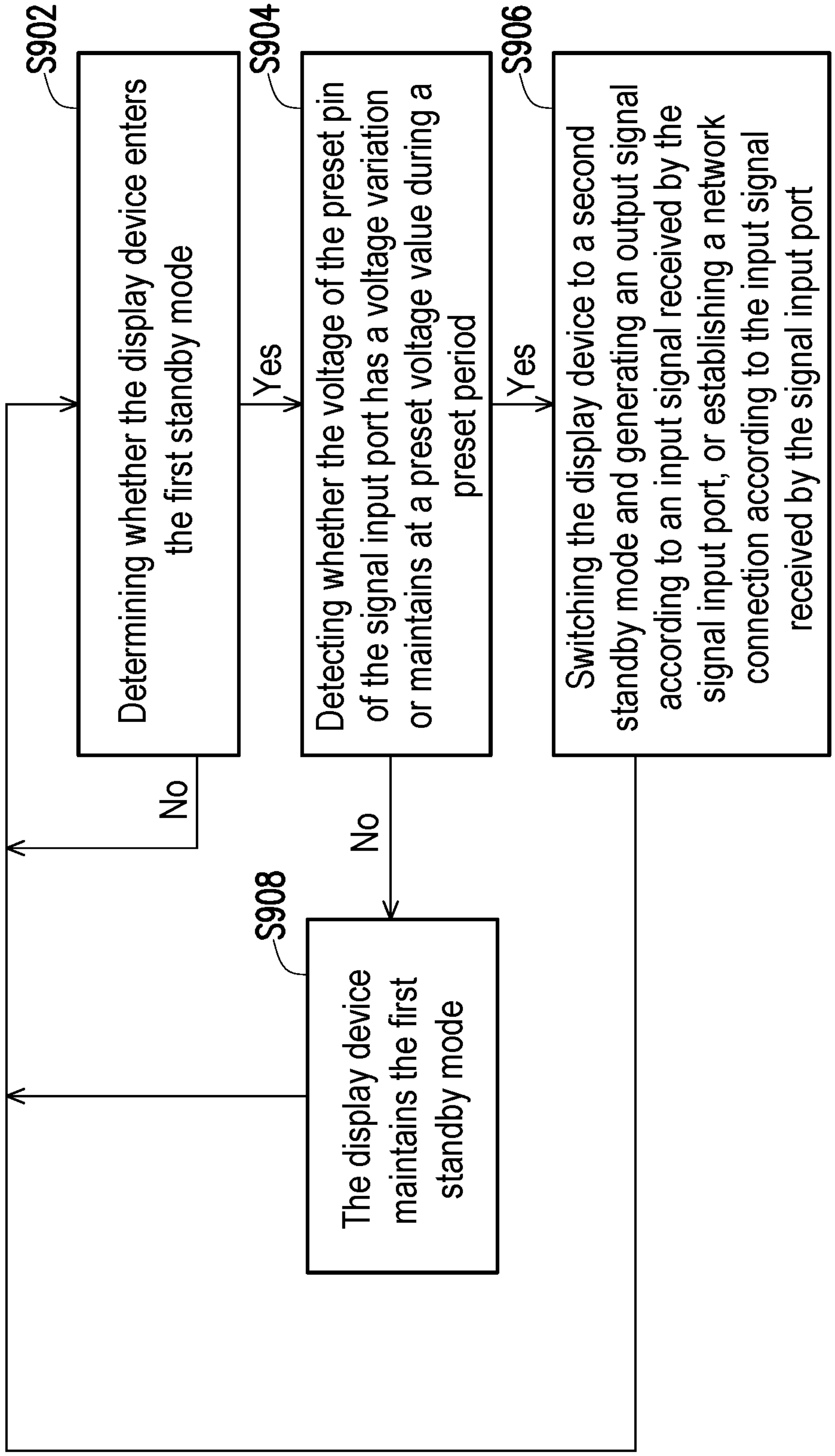
FIG. 9 is a flowchart of a display system and a power-saving method thereof according to another embodiment of the disclosure.

FIG. 9 is a flowchart of a power-saving method of a display system according to an embodiment of the disclosure. The display system includes a display device, and the display device includes an illumination module, a signal input port, a signal output port, a power supply module, and a control circuit. The signal input port and the signal output port may be, for example, RJ45 ports, VGA ports, HDMI ports, audio ports, TRS ports, or S/PDIF ports, but not limited thereto. The display device is adapted to switch between a normal operation mode, a first standby mode, and a second standby mode. The illumination module provides an illumination beam in the normal operation mode, and does not provide the illumination beam in the first standby mode and the second standby mode. It may be known from the above embodiments that the power-saving method of the display system may at least include the following steps. First, by the control circuit of the display device, it is determined whether the display device enters the first standby mode (step S902). The control circuit can, for example, determine the operation mode of the display device according to a remote control signal. For example, it is determined according to the remote control signal that the display device enters the first standby mode or the normal operation mode. When the display device is in the first standby mode, the control circuit detects whether the preset pin of the signal input port generates a voltage variation or maintains at a preset voltage value during the preset period (step S904), in which the voltage variation and the preset voltage value are both greater than 0. When the voltage variation or the preset voltage value is detected, the display device is switched to the second standby mode by the control circuit, and the output signal is generated by the control circuit according to the input signal received by the signal input port, and the output signal is allowed to be transmitted to the signal output port (step S906). When the display device is switched from the first standby mode to the second standby mode, the input signal is taken as the output signal by the control circuit and transmitted to the signal output port, or the input signal is subjected to a signal conversion process to generate an output signal, which is transmitted to the signal output port. In addition, when the display device is in the second standby mode and the control circuit does not detect the voltage variation nor the preset voltage value during another preset period, the display device is switched back to the first standby mode. The input signal may, for example, include at least one of a network signal, an image signal, or an audio signal. When the input signal is a network signal, the input signal may include the aforementioned remote control signal. In addition, when the voltage variation nor the preset voltage value is not detected in step S904, the display device maintains the first standby mode (step S908).

In addition, in some embodiments, the display system may include multiple display devices, and each display device has the same structure as the display device in the above embodiments and includes an illumination module, a signal input port, a signal output port, a power supply module, and a control circuit. One of the multiple display devices connected in series may be connected to the signal source device. When multiple display devices are all switched to the second standby mode due to detecting that the preset pins of the signal input ports generate a voltage variation or maintain at a preset voltage value, the display devices may serve as relay devices to transmit the input signal provided by the signal source device, or be controlled remotely.

To sum up, the control circuit of the embodiment of the disclosure may determine whether the display device is switched to the second standby mode or the first standby mode according to whether the preset pin of the signal input port having a voltage variation or maintaining at a preset voltage value is detected during a preset period, to enable or disable the signal input port and the signal output port of the first display device. In this way, by switching the display device to the second standby mode or the first standby mode is determined according to whether the preset pin of the signal input port generates a voltage variation or maintains at a preset voltage value, the user is not required to perform cumbersome OSD menu setting for each signal transmission port of the display device, which may effectively avoid waste of time and power, and greatly improve the convenience of using the projector.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A display system, comprising:

a first display device, comprising an illumination module, a signal input port, a signal output port, and a control circuit, wherein the first display device is adapted to switch between a normal operation mode, a first standby mode, and a second standby mode; wherein the illumination module provides an illumination beam in the normal operation mode, and does not provide the illumination beam in the first standby mode and the second standby mode, the signal input port has a preset pin, in the first standby mode, the signal input port and the signal output port are disabled, and in the second standby mode, the signal input port and the signal output port are enabled, the control circuit is coupled to the illumination module, the signal input port, and the signal output port, wherein in the first standby mode, the control circuit detects whether the preset pin of the signal input port generates a voltage variation or maintains at a preset voltage value during a preset period, when the control circuit detects the voltage variation or the preset voltage value, the control circuit switches the first display device from the first standby mode to the second standby mode, and generates an output signal according to an input signal received by the signal input port and allows the output signal to be transmitted to the signal output port, or establishes a network connection of the first display device according to the input signal received by the signal input port, when the control circuit does not detect the voltage variation nor the preset voltage value, the first standby mode is maintained by the control circuit, wherein both the voltage variation and the preset voltage value are greater than 0.

2. The display system according to claim 1, wherein when the first display device is switched from the first standby mode to the second standby mode, the control circuit takes the input signal as the output signal and transmits the output signal to the signal output port, or performs a signal conversion process on the input signal to generate the output signal and transmits the output signal to the signal output port.

3. The display system according to claim 1, wherein the control circuit further provides a status signal to a signal source device providing the input signal through the signal input port, and the status signal indicates an operation mode of the first display device.

4. The display system according to claim 1, wherein the input signal comprises at least one of at least one of a network signal, an image signal, or an audio signal.

5. The display system according to claim 4, wherein the first display device further comprises a network card chip, the network card chip is coupled between the signal input port and the control circuit, when the first display device is switched from the first standby mode to the second standby mode, the control circuit turns on the network card chip to establish the network connection.

6. The display system according to claim 4, wherein when the input signal is the network signal, the input signal comprises a remote control signal, and the control circuit switches the first display device to the normal operation mode, the first standby mode, or the second standby mode according to the remote control signal.

7. The display system according to claim 1, further comprising:

a second display device, the second display device having the illumination module, the signal input port, the signal output port, and the control circuit as described in claim 1, wherein the signal input port of the second display device is coupled to the signal output port of the first display device.

8. The display system according to claim 7, wherein when the first display device is in the second standby mode and the second display device is in a first standby mode, the control circuit of the second display device detects whether a preset pin of the signal input port generates a voltage variation or maintains at a preset voltage value during a preset period, when the control circuit of the second display device detects the voltage variation or the preset voltage value, the control circuit of the second display device switches the second display device to a second standby mode.

9. The display system according to claim 1, wherein the signal input port and the signal output port are RJ45 ports, VGA ports, HDMI ports, audio ports, TRS ports, or S/PDIF ports.

10. The display system according to claim 1, wherein the first display device is in the second standby mode, when the control circuit does not detect the voltage variation nor the preset voltage value of the preset pin of the signal input port during another preset period, the control circuit switches the first display device to the first standby model.

11. A power-saving method of a display system, the display system comprising a first display device, the first display device comprising an illumination module, a signal input port, a signal output port, and a control circuit, wherein the first display device is adapted to switch between a normal operation mode, a first standby mode, and a second standby mode, the illumination module provides an illumination beam in the normal operation mode, and does not provide the illumination beam in the first standby mode and the second standby mode, wherein the power-saving method of the display system comprises:

determining whether the first display device is in the first standby mode by the control circuit of the first display device;

detecting whether a preset pin of the signal input port generates a voltage variation or maintains at a preset voltage value by the control circuit during a preset period when the first display device is in the first standby mode;

switching the first display device to the second standby mode by the control circuit when the voltage variation or the preset voltage value is detected;

generating an output signal by the control circuit according to an input signal received by the signal input port, and allowing the output signal to be transmitted to the signal output port, or establishing a network connection of the first display device by the control circuit according to the input signal received by the signal input port; and maintaining the first display device in the first standby mode when neither the voltage variation nor the preset voltage value is detected, wherein both the voltage variation and the preset voltage value are greater than 0.

12. The power-saving method of the display system according to claim 11, wherein when the first display device is switched from the first standby mode to the second standby mode, taking the input signal as the output signal and transmitting the output signal to the signal output port, or performing a signal conversion process on the input signal to generate the output signal and transmitting the output signal to the signal output port by the control circuit.

13. The power-saving method of the display system according to claim 11, wherein the input signal comprises at least one of a network signal, an image signal, or an audio signal.

14. The power-saving method of the display system according to claim 13, wherein the first display device further comprises a network card chip, the network card chip is coupled between the signal input port and the control circuit, when the first display device is switched from the first standby mode to the second standby mode, the control circuit turns on the network card chip to establish the network connection.

15. The power-saving method of the display system according to claim 13, wherein when the input signal is the network signal, the input signal comprises a remote control signal, and the control circuit switches the first display device to the normal operation mode, the first standby mode, or the second standby mode according to the remote control signal.

16. The power-saving method of the display system according to claim 11, wherein the display system further comprises a second display device, the second display device comprises the illumination module, the signal input port, the signal output port, and the control circuit as described in claim 11, the power-saving method of the display system comprises:

transmitting the output signal from the first display device to the signal input port of the second display device when the first display device is in the second standby mode and the second display device is in the first standby mode.

17. The power-saving method of the display system according to claim 16, further comprising: switching the second display device to a second standby mode by the control circuit of the second display device by detecting the voltage variation or the preset voltage value of the signal input port.

18. The power-saving method of the display system according to claim 11, wherein the signal input port and the signal output port are RJ45 ports, VGA ports, HDMI ports, audio ports, TRS ports, or S/PDIF ports.

19. The power-saving method of the display system according to claim 11, further comprising:

switching the first display device to the first standby mode by the control circuit not detecting the voltage variation nor the preset voltage value during another preset period when the first display device is in the second standby mode.

* * * * *